US011627201B2

(12) United States Patent
Pattabiraman

(10) Patent No.: US 11,627,201 B2
(45) Date of Patent: Apr. 11, 2023

(54) OPTIMIZING NETWORK UTILIZATION

(71) Applicant: Google LLC, Mountain View, CA (US)

(72) Inventor: Bharath Pattabiraman, Sunnyvale, CA (US)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 17/118,101

(22) Filed: Dec. 10, 2020

(65) Prior Publication Data
US 2021/0099545 A1 Apr. 1, 2021

Related U.S. Application Data

(63) Continuation of application No. 16/344,243, filed as application No. PCT/US2018/030316 on Apr. 30, 2018, now Pat. No. 11,356,517.

(51) Int. Cl.
H04L 67/60 (2022.01)
H04L 65/612 (2022.01)
H04L 43/0876 (2022.01)
H04L 67/146 (2022.01)
H04L 67/50 (2022.01)

(52) U.S. Cl.
CPC .......... H04L 67/60 (2022.05); H04L 43/0876 (2013.01); H04L 65/612 (2022.05); H04L 67/146 (2013.01); H04L 67/535 (2022.05)

(58) Field of Classification Search
CPC . H04L 67/32; H04L 43/0876; H04L 65/4084; H04L 67/146; H04L 67/22
See application file for complete search history.

(56) References Cited

U.S. PATENT DOCUMENTS 8,880,672 B2 9/2014 Kuzmin et al.
9,563,900 B1 2/2017 Guo et al.
(Continued)

FOREIGN PATENT DOCUMENTS

CN 1499805 5/2004
CN 107609184 A * 1/2018
(Continued)

OTHER PUBLICATIONS

Office Action in European Appln. No. 18728474.0, dated Dec. 23, 2021, 10 pages.
(Continued)

Primary Examiner — Soe Hlaing
(74) Attorney, Agent, or Firm — Fish & Richardson P.C.

(57) ABSTRACT

Methods, systems, and apparatus, including computer programs encoded on a computer storage medium, for receiving a packetized message that is generated by signaling of a tag that is included in code of a given online resource and includes an identifier corresponding to a user that is accessing the given online resource, logging a timestamp as a start of a user session at a web site that includes the given online resource, determining that the user session remains active while additional packetized messages continue to be received, determining that the user session at the web site has ended, calculating a duration of the user session based on a difference between the timestamp and a time when the user session at the website was determined to have ended, and modifying distribution of content to the user based on the duration of the user session at the website.

14 Claims, 6 Drawing Sheets

(56) References Cited

U.S. PATENT DOCUMENTS

| | | | |
|---|---|---|---|
| 2002/0169868 A1 | 11/2002 | Lopke et al. | |
| 2008/0027924 A1* | 1/2008 | Hamilton | G06F 16/9535 |
| | | | 707/999.005 |
| 2009/0198507 A1* | 8/2009 | Rhodus | G06Q 30/02 |
| | | | 705/14.66 |
| 2013/0282890 A1 | 10/2013 | Ma et al. | |
| 2014/0317653 A1 | 10/2014 | Mlodzinksi | |
| 2016/0117740 A1 | 4/2016 | Linden et al. | |
| 2016/0212139 A1 | 7/2016 | Pike | |
| 2017/0085658 A1* | 3/2017 | Todd | H04L 67/22 |
| 2017/0213226 A1 | 7/2017 | Guo et al. | |
| 2018/0032628 A1 | 2/2018 | Anderson et al. | |
| 2019/0245896 A1* | 8/2019 | Lakshmanan | H04L 65/4015 |

FOREIGN PATENT DOCUMENTS

| | | |
|---|---|---|
| EP | 2204954 | 12/2017 |
| JP | 2008-508805 | 3/2008 |
| JP | 2009265833 | 11/2009 |
| JP | 2010177797 | 8/2010 |
| JP | 2013-523049 | 6/2013 |
| JP | 2015516095 | 6/2015 |
| KR | 101828618 | 2/2018 |
| WO | WO 2017035111 | 3/2017 |

OTHER PUBLICATIONS

IN Office Action in Indian Appln. No. 202027007538, dated May 19, 2021, 8 pages.

JP Office Action in Japanese Appln. No. 2020516405, dated May 17, 2021, 10 pages (with English translation).

EP Office Action in European Appln. No. 18728474.0, dated Mar. 27, 2020, 15 pages.

PCT International Search Report and Written Opinion in International Appln. No. PCT/US2018/030316, dated Sep. 18, 2018, 19 pages.

Notice of Allowance in Korean Appln. No. 10-2020-7007989, dated Apr. 11, 2022, 3 pages (with English translation).

Office Action in Chinese Appln. No. 201880060804.7, dated Feb. 16, 2023, 35 pages (with English translation).

* cited by examiner

OPTIMIZING NETWORK UTILIZATION

CROSS-REFERENCE TO RELATED APPLICATIONS

This application is a continuation application of, and claims priority to, U.S. patent application Ser. No. 16/344,243, filed on Apr. 23, 2019, which is a national stage application, filed under 35 U.S.C. § 371 of PCT International Application No. PCT/US2018/030316, filed on Apr. 30, 2018, which are incorporated by reference herein in their entirety.

BACKGROUND

The Internet provides access to a wide variety of resources. For example, video and/or audio files, as well as web pages for particular subjects or particular news articles are accessible over the Internet. The bandwidth consumed delivering content over the Internet continues to increase as the distribution of media-rich content is becoming more common. In some situations, the utilization of this bandwidth can be improved.

SUMMARY

This specification describes technologies relating to optimizing network utilization based on prior utilization of the network.

In general, one innovative aspect of the subject matter described in this specification can be embodied in methods that include the actions of receiving, over a network and by a digital component distribution system, a packetized message that (i) is generated by signaling of a tag that is included in code of a given online resource and (ii) includes an identifier corresponding to a user that is accessing the given online resource, logging, by the digital component distribution system, a timestamp of the packetized message as a start of a user session at a website that includes the given online resource, determining, by the digital component distribution system, that the user session at the website remains active while additional packetized messages generated by signaling of additional tags within the website continue to be received within a specified amount of time after a time of a timestamp of a most recently received packetized message, determining, by the digital component distribution system, that the user session at the website has ended upon one of (i) the specified amount of time after the time of the timestamp of the most recently received packetized message being received or (ii) detecting content view data specifying that third-party content was provided to a different website in response to a request that included the identifier corresponding to the user, calculating, by the digital component distribution system, a duration of the user session based on a difference between the timestamp and a time when the user session at the website was determined to have ended, and modifying distribution of content to the user based on the duration of the user session at the website.

These and other embodiments can each optionally include one or more of the following features.

In some examples, the timestamp of the packetized message is either included in the packetized message or determined based on a time of an arrival of the packetized message.

In some examples, modifying distribution of content to the user based on the duration of the user session at the website includes controlling bandwidth usage for distribution of content based on the calculated duration of the user session.

In some examples, controlling bandwidth usage for distribution of content based on the duration of the user session includes reducing an amount of bandwidth used for distribution of content to the user when the duration of the user session is below a specified amount.

In some examples, the method includes determining that the duration of the user session exceeds a threshold duration, wherein modifying distribution of content to the user based on the duration of the user session includes in response to determining that the user session exceeds a threshold duration pre-caching, at a client device of the user, data of web pages of the website when the user subsequently initiates a new session at the website.

In some examples, the method includes storing the calculated duration of the user session for the user and the identifier for the user in a data structure with other user session durations at the website for other users and other identifiers for the other users to obtain an aggregate set of user session data for users that visited the website, and segmenting the aggregate set of user session data into two or more subsets based on lengths of time specified by the user session durations, including: creating a first subset of user session data that includes the identifiers of the users corresponding to the user session durations that are less than a specified duration, and creating a second subset of the user session data that includes the identifiers of the users corresponding to the user session durations that exceed the specified duration.

In some examples, modifying distribution of content to the user based on the duration of the user session at the website includes providing the users corresponding to the identifiers in the second subset additional content related to the website when those users visit other websites based on those users being included in the second subset.

In some examples, the method includes providing a user interface that presents an administrator of the website with information about the two or more subsets, including a number of the identifiers that are included in each subset, and providing the administrator with a control that designates at least one of the two or more subsets as intended recipients of additional content related to the website when the users corresponding to the identifiers visit other websites or native applications.

In some examples, the method includes detecting device type identifiers in the packetized message and other packetized messages that include the identifier corresponding to the device type, and determining, for user sessions corresponding to the packetized message and the other packetized messages, a portion of the user sessions that were conducted using a mobile device based on the device type identifiers, wherein modifying distribution of content to the user based on the duration of the user session at the website includes modifying the distribution of content based on the portion of the user sessions that were conducted using the mobile device.

Other embodiments of this aspect can include corresponding systems, apparatus, and computer programs, configured to perform the actions of the methods, encoded on computer storage devices.

In general, another innovative aspect of the subject matter described in this specification can be embodied in a system that includes a data processing apparatus, and a non-transitory computer readable storage medium in data communication with the data processing apparatus and storing instructions executable by the data processing apparatus and upon such execution cause the data processing apparatus to perform operations. The operations include receiving, over a network and by a digital component distribution system, a packetized message that (i) is generated by signaling of a tag that is included in code of a given online resource and (ii) includes an identifier corresponding to a user that is accessing the given online resource, logging, by the digital component distribution system, a timestamp of the packetized message as a start of a user session at a website that includes the given online resource, determining, by the digital component distribution system, that the user session at the website remains active while additional packetized messages generated by signaling of additional tags within the web site continue to be received within a specified amount of time after a time of a timestamp of a most recently received packetized message, determining, by the digital component distribution system, that the user session at the web site has ended upon one of (i) the specified amount of time after the time of the timestamp of the most recently received packetized message being received or (ii) detecting content view data specifying that third-party content was provided to a different web site in response to a request that included the identifier corresponding to the user, calculating, by the digital component distribution system, a duration of the user session based on a difference between the timestamp and a time when the user session at the website was determined to have ended, and modifying distribution of content to the user based on the duration of the user session at the website.

In general, another innovative aspect of the subject matter described in this specification can be embodied in a non-transitory computer storage medium encoded with a computer program, the computer program including instructions that when executed by a data processing apparatus cause the data processing apparatus to perform operations. The operations include receiving, over a network and by a digital component distribution system, a packetized message that (i) is generated by signaling of a tag that is included in code of a given online resource and (ii) includes an identifier corresponding to a user that is accessing the given online resource, logging, by the digital component distribution system, a timestamp of the packetized message as a start of a user session at a website that includes the given online resource, determining, by the digital component distribution system, that the user session at the website remains active while additional packetized messages generated by signaling of additional tags within the web site continue to be received within a specified amount of time after a time of a timestamp of a most recently received packetized message, determining, by the digital component distribution system, that the user session at the web site has ended upon one of (i) the specified amount of time after the time of the timestamp of the most recently received packetized message being received or (ii) detecting content view data specifying that third-party content was provided to a different web site in response to a request that included the identifier corresponding to the user, calculating, by the digital component distribution system, a duration of the user session based on a difference between the timestamp and a time when the user session at the website was determined to have ended, and modifying distribution of content to the user based on the duration of the user session at the website.

Particular embodiments of the subject matter described in this specification can be implemented so as to realize one or more of the following advantages. Modifying which content is provided to specific sets or subsets of users can result in more efficient utilization of bandwidth and computing resources. For example, the amount of (or size of) content provided to users that spend more time at a website can be higher than the amount of (or size of) content provided to users that spend less time at the website. In some situations, additional content can be pre-cached at a client device when the user has been classified as one of the users that spend more time at the website (e.g., at least a specified amount of time). Alternatively, content that takes longer to download (e.g., image content and/or multimedia content) can be provided when the user has been classified as one of the users that spend more time at the website. Meanwhile, content that takes less time to download (e.g., text content) can be provided when the user has been classified as one of the users that spends less time at the website. In this way, more bandwidth is utilized to provide content to those users that have been classified as spending more time at the website. Additionally, limiting distribution of content that takes more time to download to those users that spend more time at the website reduces the likelihood that the user will have navigated away from the web site before the content has been downloaded to the client device, such that bandwidth utilized to download the content is not wasted. In some situations, users that spend less than a threshold amount of time at the web site can be excluded from receiving certain content, thereby preserving bandwidth to provide content to users that spend more time at the website.

Hence, in accordance with some embodiments described herein, based on the calculated duration of the user session, bandwidth usage may be controlled. For example, controlling bandwidth usage may include increasing or decreasing bandwidth of a communication channel used by the client device. For example, the calculated duration of the user session may be communicated to the bandwidth controller that effects said increase or decrease of the bandwidth. For example, a further action of the method illustrated above may include the generation of a control message that indicates the calculated duration of the user session, and the generated message may be communicated to a network entity configured to carry out said bandwidth modification in response to receiving the control message.

In accordance with further embodiments, segmenting the aggregate set of user session data into two or more subsets can improve prediction models for auto segmentation of a population of users (e.g., based on an amount of time that the user spent at a given website). Content providers can utilize the segmentation of the population of users to specify which of the subsets of users should be provided with their content. For example, a given content provider may specify that only those users that spend at least a specified amount of time at the given web site should receive their content.

In addition, in accordance with one or more embodiments, by determining the user session duration data, analytic tools can be further enhanced with information that was not previously available. For example, the enhanced data can improve accuracy of predicting various outcomes related to the content, and in turn, improve the current systems that content providers and content distributors use to optimize distribution of content to users. This improvement to the current system can result in users receiving content that is more aligned with their interests, while reducing the amount of less relevant content that these users receive. Thus, the improvements discussed in this document can lead to a more personalized and more efficient (e.g., in terms of bandwidth usage) online browsing experience, for example, by filtering content provided to a given user based on the amount of time that the given user spends on various websites.

Exemplary embodiment of the subject matter disclosed in this document also improve the system's ability to delineate and/or measure a duration of user sessions with various online resources and/or native applications provided by a given content provider. For example, using traditional systems it is difficult to determine when a user session at a given web site had ended because there is often a lack of a reliable signal indicating that the user session has ended. As described in detail below, the present system provides improvements over traditional systems by leveraging two different types of data to improve the ability of the system to accurately determine when the user session at a given website has ended. More specifically, the present system directly tracks user activity at the given website using tag data collected when tags that are included in code of the given website fire. While this tag data provides information about user activity at the given website, it cannot provide information about user navigation to a different website, which limits the ability to definitively determine when the user session has ended in some situations. To improve the ability to determine when the user session at the given website has ended, the present system enhances the tag data by combining it with content view data that are generated when the user navigates to a different website. This content view data that are generated when the user navigates to a different website provide a definitive signal indicating that the user in fact navigated away from the given website, and therefore, enable the system to more accurately determine when the user session at the given website ended. As such, enhancing the tag data with the content view data enables the system to perform operations that it could not previously perform, thereby improving the performance of the system itself and providing advantages over existing systems.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
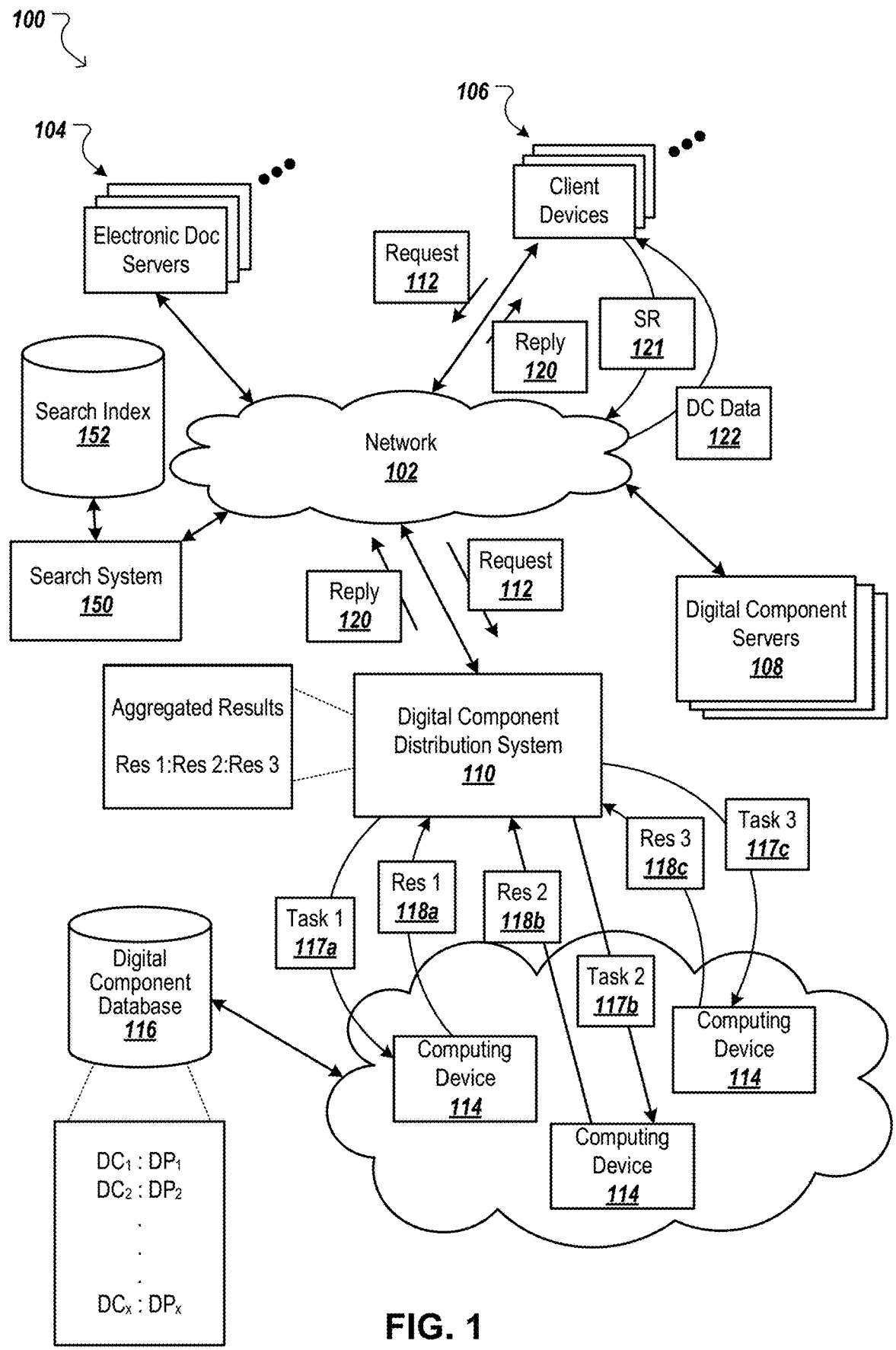
FIG. 1 is a block diagram of an example environment for distributing content.

Systems, methods, and computer program products are described for modifying the distribution of content to a user based on a calculated duration of a user session at a website, native application, and/or other available Internet connected resources provided by a same content provider. For brevity, the description that follows refers to user navigation among webpages and websites, but the description is also applicable with respect to native applications and/or combinations of different Internet connected resources provided by the same content provider. The user session duration data may be determined by a digital component distribution system and requested by a content provider. For example, the content provider may host a website, provide a native application, and/or distribute content (e.g., in the form of a digital component) that is presented to users when they are not visiting the website. The content provider may use the user session duration data, which was not previously known, to identify users who engage with a content provider's owned online resources (and/or native applications) for at least a specified period of time. The content provider may elect to designate those identified users as future recipients of additional content (e.g., digital components) provided by the content provider. The user session data can also be used by a content provider to automatically segment users based on their engagement so as to optimize the distribution of additional content to those users that engaged with the content providers Internet connected resources during the longest user sessions.

As discussed in more detail below, the user session duration data can be generated using a combination of tag data and content view data. Generally, the tag data specifies a unique identifier of a user that is interacting with a document (e.g., any electronic document and/or native application) that includes a tag that is signaled (herein also referred to as "fired") by the client device. For example, when a document including a tag is rendered by a client device, the tag will fire and cause the client device to transmit a packetized message to a remote server informing the remote server that the document was presented to the user corresponding to the unique identifier. The content view data is generally collected when a client device requests content (e.g., a digital component) to be integrated into a document being presented by the client device. As discussed below, using timestamps to correlate tag data that was collected from user interaction with documents provided by a given content provider with content view data collected when a different document provided by a different content provider requests content to be embedded in the different document enables the system to accurately determine how long a user session with documents provided by the given content provider lasted. For example, the time at which the content view data was collected can be used as a signal indicating that the user session at the documents provided by the given content provider has ended.

In some implementations, a user session can be deemed ended when the system hasn't received tag data for a certain period of time. The lack of tag data can occur, for example, when a user leaves a browsing session and switches to a different application on the phone, or stops using the mobile device all together, for a period of greater than the specified amount of time (e.g., 10 minutes, 15 minutes, 30 minutes, or another appropriate amount of time).

In accordance with an embodiment, a method of calculating the duration of a user session may include the following steps.

Receiving, over a network and by a digital component distribution system, a packetized message that (i) is generated by signaling of a tag that is included in code of a given online resource and (ii) includes an identifier corresponding to a user that is accessing the given online resource. Examples of a network, a digital component distribution system, a packetized message, and an identifier are described further below. Also, examples of how the packetized message can be signaled will be elucidated.

Figure 4:
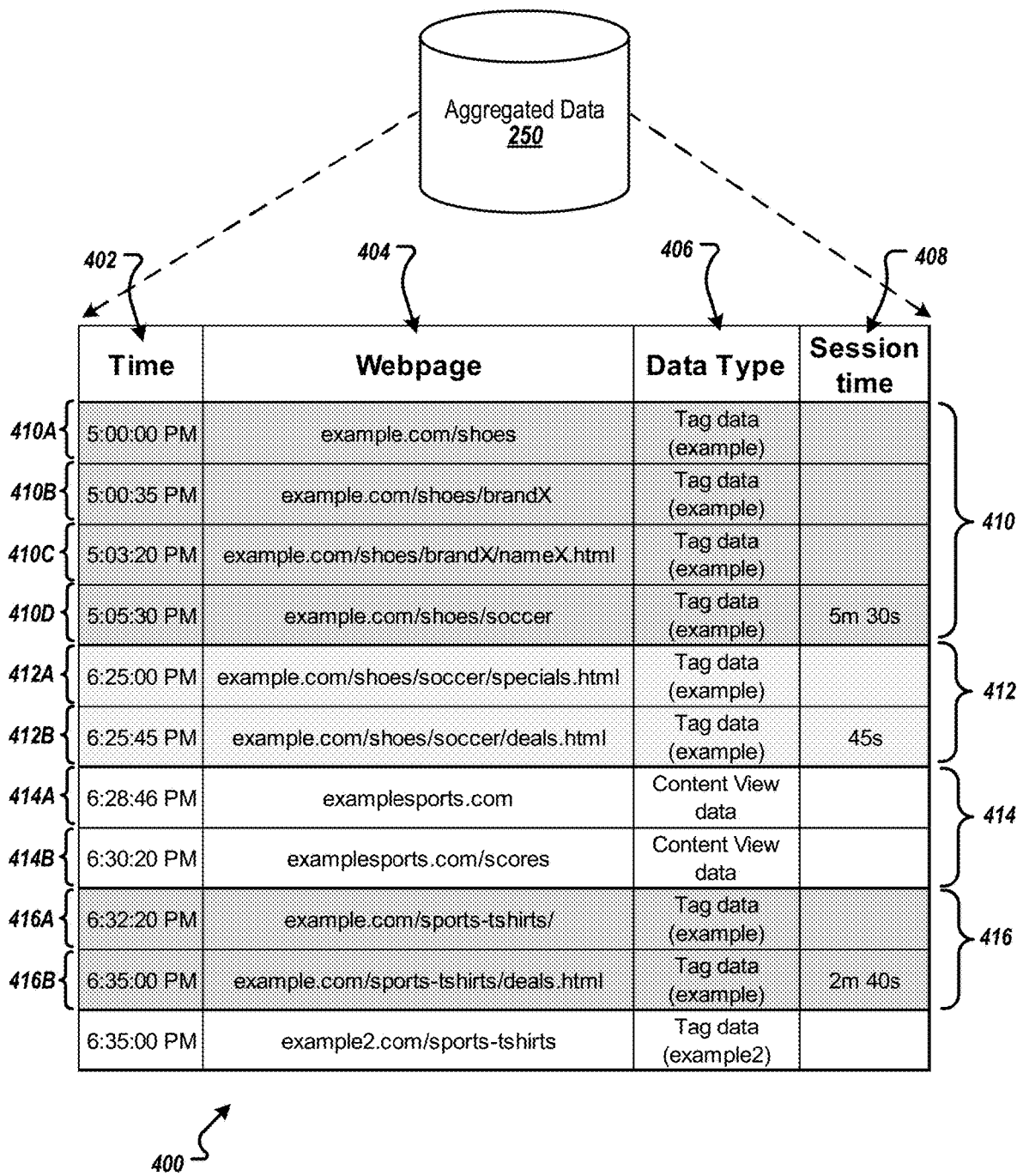
FIG. 4 is an example set of aggregated data using a digital component distribution system.

Logging, by the digital component distribution system, a timestamp of the packetized message as a start of a user session at a website that includes the given online resource. As will become more apparent from the further description, the timestamp of the packetized message is either included in the packetized message or determined based on a time of an arrival of the packetized message. For example, the timestamp indicates the point of time of arrival of the packetized message or, respectively, a point of time of signalling of the packetized message. An example data set that illustrates logged timestamps is illustrated in FIG. 4.

Determining, by the digital component distribution system, that the user session at the website remains active while additional packetized messages generated by signaling of additional tags within the website continue to be received within a specified amount of time after a time of a timestamp of a most recently received packetized message. For example, while it is determined that the user session at the website remains active, it is also determined that the user session at the website has not ended yet. As indicated above, the specified amount of time may amount to, e.g., 10 minutes, 15 minutes, 30 minutes, or another appropriate amount of time. If, during this amount time after the time of the timestamp, an additional packetized message generated by signaling of additional tags within the web site is received, it is determined that the user session at the website has not ended yet but remains active. For example, the timestamp of the additional packetized message resets a timer, such that the specified amount of time is again the basis for determining whether or not the user session remains active.

Determining, by the digital component distribution system, that the user session at the website has ended upon one of (i) the specified amount of time after the time of the timestamp of the most recently received packetized message being received or (ii) detecting content view data specifying that third-party content was provided to a different website in response to a request that included the identifier corresponding to the user. As has just been explained, determination that the user session has ended may be based on determining that the specified amount of time has lapsed without receipt of any additional packetized message. Another trigger for said determination can be detection that content view data specifying that third-party content was provided to a different web site in response to a request that included the identifier corresponding to the user. The term content view data has already been explained above and further examples are given further below. For example, the content view data indicates that the user has in the meanwhile visited the different website that, e.g., rendered said third-party content. Hence, detecting that the user has viewed and/or downloaded third-party content at a different website may be indicative for an abortion of the user session. In this example, the phrase third party content refers to content provided by an entity other than the entity that provides the different website. For example, the third party content can be an image, text, or other content (e.g., multimedia content) that is requested through execution of a script included in a web page and inserted into the web page from a remote server when the web page is being rendered.

Calculating, by the digital component distribution system, a duration of the user session based on a difference between the timestamp and a time when the user session at the website was determined to have ended. For example, the duration of the user session is identical to the difference between the time of the timestamp (e.g., of the most recent (additional) packetized message) and the time of when the user session at the website was determined to have ended. In another embodiment, the difference between the timestamp and a time when the user session at the website was determined to have ended can for example be scaled with a predetermined factor.

Modifying distribution of content to the user based on the duration of the user session at the website. As indicated above, modifying distribution of content to the user based on the duration of the user session at the website may include controlling bandwidth usage for distribution of content based on the calculated duration of the user session. For example, controlling bandwidth usage for distribution of content based on the duration of the user session includes reducing an amount of bandwidth used for distribution of content to the user when the duration of the user session is below a specified amount. For example, when a user tends to spend little time at a website the content provided to the user may be limited to text content. Alternatively, or additionally, the amount of multimedia content loaded in these situations may be limited to reduce the amount of bandwidth utilized to provide content to the user that spends very little time at the website. Furthermore, digital components that reference the website (e.g., include a hyperlink to the website) can be prevented from being distributed to users that spend very little time at the website (e.g., have user session durations below a specified duration).

In accordance with an embodiment, the method of calculating the duration of a user session may include one or more of the following additional steps.

Determining that the duration of the user session exceeds a threshold duration, wherein modifying distribution of content to the user based on the duration of the user session includes in response to determining that the user session exceeds a threshold duration pre-caching, at a client device of the user, data of web pages of the website when the user subsequently initiates a new session at the website. In some situations, the digital component distribution system can determine that the duration of the user session exceeds a threshold duration. In these situations, the distribution of content to the user can be modified by pre-caching, at a client device of the user, data of web pages of the website when the user subsequently initiates a new session at the website. For example, when that user subsequently requests a first web page of the website, content of other webpages in the website (e.g., pages frequently visited by that user) can be cached at the client device to speed navigation among pages of the website. This pre-caching can be limited to those users that spend at least a minimum amount of time at the website so as to not waste bandwidth pre-caching data at client devices of users that are not likely to navigate to many pages of the website.

Storing the calculated duration of the user session for the user and the identifier for the user in a data structure with other user session durations at the website for other users and other identifiers for the other users to obtain an aggregate set of user session data for users that visited the website.

Segmenting the aggregate set of user session data into two or more subsets based on lengths of time specified by the user session durations, which may include one or more of the following additional steps. Creating a first subset of user session data that includes the identifiers of the users corresponding to the user session durations that are less than a specified duration. Creating a second subset of the user session data that includes the identifiers of the users corresponding to the user session durations that exceed the specified duration. For example, distribution of content to the user based on the duration of the user session at the website includes providing the users corresponding to the identifiers in the second subset additional content related to the website when those users visit other websites based on those users being included in the second subset. The exemplary step of segmenting the aggregate set of user session data will be explained in more detail further below.

These features and additional features are described in more detail below.

FIG. 1 is a block diagram of an example environment 100 in which digital components are distributed for presentation with electronic documents. The example environment 100 includes a network 102, such as a local area network (LAN), a wide area network (WAN), the Internet, or a combination thereof. The network 102 connects electronic document servers 104, client devices 106, digital component servers 108, and a digital component distribution system 110 (also referred to as a component distribution system). The example environment 100 may include many different electronic document servers 104, client devices 106, and digital component servers 108.

A client device 106 is an electronic device that is capable of requesting and receiving resources over the network 102. Example client devices 106 include personal computers, mobile communication devices (e.g., smartphones), and other devices (e.g., tablet devices or wearable computing devices) that can send and receive data over the network 102. A client device 106 typically includes a user application, such as a web browser, to facilitate the sending and receiving of data over the network 102, but native applications executed by the client device 106 can also facilitate the sending and receiving of data over the network 102.

An electronic document is data that presents a set of content at a client device 106. Examples of electronic documents include webpages, word processing documents, portable document format (PDF) documents, images, videos, search results pages, and feed sources. Native applications (e.g., "apps"), such as applications installed on mobile, tablet, or desktop computing devices are also examples of electronic documents. Electronic documents can be provided to client devices 106 by electronic document servers 104 ("Electronic Doc Servers"). For example, the electronic document servers 104 can include servers that host publisher websites. In this example, the client device 106 can initiate a request for a given publisher webpage, and the electronic document server 104 that hosts the given publisher webpage can respond to the request by sending machine executable instructions that initiate presentation of the given webpage at the client device 106.

In another example, the electronic document server 104 can include app servers from which client devices 106 can download apps. In this example, the client device 106 can download files required to install an app at the client device 106, and then execute the downloaded app locally.

Electronic documents can include a variety of content. For example, an electronic document can include static content (e.g., text or other specified content) that is within the electronic document itself and/or does not change over time. Electronic documents can also include dynamic content that may change over time or on a per-request basis. For example, a publisher of a given electronic document can maintain a data source that is used to populate portions of the electronic document. In this example, the given electronic document can include one or more tags or scripts that cause the client device 106 to request content from the data source when the given electronic document is processed (e.g., rendered or executed) by a client device 106. The client device 106 integrates the content obtained from the data source into the given electronic document to create a composite electronic document including the content obtained from the data source. An electronic document (which for brevity is also simply referred to as a document) does not necessarily correspond to a file. A document may be stored in a portion of a file that holds other documents, in a single file dedicated to the document in question, or in multiple coordinated files. An electronic document can be in the form of a web page, a native application user interface, or another appropriate electronic format.

In some situations, a given electronic document can include one or more digital component tags or digital component scripts that reference the digital component distribution system 110. In these situations, the digital component tags or digital component scripts are executed by the client device 106 when the given electronic document is processed by the client device 106. Execution of the digital component tags or digital component scripts configures the client device 106 to generate a request for one or more digital components 112 (referred to as a "component request"), which is transmitted over the network 102 to the digital component distribution system 110. For example, a digital component tag or digital component script can enable the client device 106 to generate a packetized data request including a header and payload data. The component request 112 can include event data specifying features such as a name (or network location) of a server from which the digital component is being requested, a name (or network location) of the requesting device (e.g., the client device 106), and/or information that the digital component distribution system 110 can use to select one or more digital components provided in response to the request. The component request 112 is transmitted, by the client device 106, over the network 102 (e.g., a telecommunications network) to a server of the digital component distribution system 110.

The component request 112 can include event data specifying other event features, such as the electronic document being requested and characteristics of locations of the electronic document at which digital component can be presented. For example, event data specifying a reference (e.g., URL) to an electronic document (e.g., webpage) in which the digital component will be presented, available locations of the electronic documents that are available to present digital components, sizes of the available locations, and/or media types that are eligible for presentation in the locations can be provided to the digital component distribution system 110. Similarly, event data specifying keywords associated with the electronic document ("document keywords") or entities (e.g., people, places, or things) that are referenced by the electronic document can also be included in the component request 112 (e.g., as payload data) and provided to the digital component distribution system 110 to facilitate identification of digital components that are eligible for presentation with the electronic document. The event data can also include a search query that was submitted from the client device 106 to obtain a search results page, and/or data specifying search results and/or textual, audible, or other visual content that is included in the search results. As used throughout this document, the term search query and query should be interpreted as covering queries beyond traditional search queries that are submitted through a traditional search engine. For example, these terms are intended to cover other types of queries, such as voice queries, voice commands, or voice instructions that are received by an artificial intelligence assistant, as well as other interactions with an artificial intelligence assistant.

Component requests 112 can also include event data related to other information, such as information that a user of the client device has provided, geographic information indicating a state or region from which the component request was submitted, or other information that provides context for the environment in which the digital component will be displayed (e.g., a time of day of the component request, a day of the week of the component request, a type of device at which the digital component will be displayed, such as a desktop device, a mobile device, or a tablet device). Component requests 112 can be transmitted, for example, over a packetized network, and the component requests 112 themselves can be formatted as packetized data having a header and payload data. The header can specify a destination of the packet and the payload data can include any of the information discussed above.

The component distribution system 110 chooses digital components that will be presented with the given electronic document in response to receiving the component request 112 and/or using information included in the component request 112. In some implementations, a digital component is selected in less than a second to avoid errors that could be caused by delayed selection of the digital component. For example, delays in providing digital components in response to a component request 112 can result in page load errors at the client device 106 or cause portions of the electronic document to remain unpopulated even after other portions of the electronic document are presented at the client device 106. Also, as the delay in providing the digital component to the client device 106 increases, it is more likely that the electronic document will no longer be presented at the client device 106 when the digital component is delivered to the client device 106, thereby negatively impacting a user's experience with the electronic document. Further, delays in providing the digital component can result in a failed delivery of the digital component, for example, if the electronic document is no longer presented at the client device 106 when the digital component is provided.

In some implementations, the digital component distribution system 110 is implemented in a distributed computing system in order to process component requests and provide one or more digital components responsive to the request in the limited amount of time for doing so (e.g., in less than a second). The distributed computing system includes, for example, a server and a set of multiple computing devices 114 that are interconnected and identify and distribute digital component in response to requests 112. The set of multiple computing devices 114 operate together to identify a set of digital components that are eligible to be presented in the electronic document from among a corpus of millions of available digital components (DC1-x). The millions of available digital components can be indexed, for example, in a digital component database 116. Each digital component index entry can reference the corresponding digital component and/or include distribution parameters (DP1-DPx) that contribute to (e.g., condition or limit) the distribution/transmission of the corresponding digital component. For example, the distribution parameters can contribute to the transmission of a digital component by requiring that a component request include at least one criterion that matches (e.g., either exactly or with some pre-specified level of similarity) one of the distribution parameters of the digital component.

In some implementations, the distribution parameters for a particular digital component can include distribution keywords that must be matched (e.g., by electronic documents, document keywords, a search query, or terms specified in the component request 112) in order for the digital component to be eligible for presentation. In other words, the distribution parameters are used to trigger distribution (e.g., transmission) of the digital components over the network 102. The distribution parameters can also require that the component request 112 include information specifying a particular geographic region (e.g., country or state) and/or information specifying that the component request 112 originated at a particular type of client device (e.g., desktop device, mobile device, or tablet device) in order for the digital component to be eligible for presentation. The distribution parameters can also specify an eligibility value (e.g., ranking score, bid, or some other specified value) that is used for evaluating the eligibility of the digital component for distribution/transmission (e.g., among other available digital components), as discussed in more detail below. In some situations, the eligibility value can specify an amount that will be submitted when a specific event is attributed to the digital component (e.g., when an application is installed at a client device through interaction with the digital component or otherwise attributable to presentation of the digital component).

The identification of the eligible digital component can be segmented into multiple tasks 117a-117c (e.g., by the server) that are then assigned (e.g., by the server) among computing devices (e.g., 114, 114b, and 114c) within the set of multiple computing devices 114. For example, different computing devices in the set 114 can each analyze a different portion of the digital component database 116 to identify various digital components having distribution parameters that match information included in the component request 112. In some implementations, each given computing device in the set 114 can analyze a different data dimension (or set of dimensions) and pass (e.g., transmit) results (Res 1-Res 3) 118a-118c of the analysis back to the digital component distribution system 110. For example, the results 118a-118c provided by each of the computing devices in the set 114 may identify a subset of digital components that are eligible for distribution in response to the component request 112 and/or a subset of the digital components that have certain distribution parameters. The identification of the subset of digital components can include, for example, comparing the event data to the distribution parameters, and identifying the subset of digital components having distribution parameters that match at least some features of the event data.

The digital component distribution system 110 aggregates the results 118a-118c received from the set of multiple computing devices 114 and uses information associated with the aggregated results to select one or more digital components that will be provided in response to the request 112. For example, the digital component distribution system 110 can select a set of winning digital components (one or more digital components) based on the outcome of one or more component evaluation processes, as discussed below. In turn, the digital component distribution system 110 can generate and transmit, over the network 102, reply data 120 (e.g., digital data representing a reply) that enables the client device 106 to integrate the set of winning digital components into the given electronic document, such that the set of winning digital components and the content of the electronic document are presented together at a display of the client device 106.

In some implementations, the client device 106 executes instructions included in the reply data 120, which configures and enables the client device 106 to obtain the set of winning digital components from one or more digital component servers 108. For example, the instructions in the reply data 120 can include a network location (e.g., a Uniform Resource Locator (URL)) and a script that causes the client device 106 to transmit a server request (SR) 121 to the digital component server 108 to obtain a given winning digital component from the digital component server 108. In response to the request, the digital component server 108 will identify the given winning digital component specified in the server request 121 (e.g., within a database storing multiple digital components) and transmit, to the client device 106, digital component data (DC Data) 122 that presents the given winning digital component in the electronic document at the client device 106.

To facilitate searching of electronic documents, the environment 100 can include a search system 150 that identifies the electronic documents by crawling and indexing the electronic documents (e.g., indexed based on the crawled content of the electronic documents). Data about the electronic documents can be indexed based on the electronic document with which the data are associated. The indexed and, optionally, cached copies of the electronic documents are stored in a search index 152 (e.g., hardware memory device(s)). Data that are associated with an electronic document is data that represents content included in the electronic document and/or metadata for the electronic document.

Client devices 106 can submit search queries to the search system 150 over the network 102. In response, the search system 150 accesses the search index 152 to identify electronic documents that are relevant to the search query. The search system 150 identifies the electronic documents in the form of search results and returns the search results to the client device 106 in a search results page. A search result is data generated by the search system 150 that identifies an electronic document that is responsive (e.g., relevant) to a particular search query, and includes an active link (e.g., hypertext link) that causes a client device to request data from a specified network location (e.g., URL) in response to user interaction with the search result. An example search result can include a web page title, a snippet of text or a portion of an image extracted from the web page, and the URL of the web page.

Another example search result can include a title of a downloadable application, a snippet of text describing the downloadable application, an image depicting a user interface of the downloadable application, and/or a URL to a location from which the application can be downloaded to the client device 106. In some situations, the search system 150 can be part of, or interact with, an application store (or an online portal) from which applications can be downloaded for install at a client device 106 in order to present information about downloadable applications that are relevant to a submitted search query.

Like other electronic documents, search results pages can include one or more slots in which digital components can be presented. As used throughout this document, the phrase "digital component" refers to a discrete unit of digital content or digital information (e.g., a video clip, audio clip, multimedia clip, image, text, or another unit of content). A digital component can be electronically stored in a physical memory device as a single file or in a collection of files, and digital components can take the form of video files, audio files, multimedia files, image files, or text files and include advertising information, such that an advertisement is a type of digital component.

Search queries that are submitted by client devices 106 can be used to identify one or more digital components that are presented with the search results page. For example, the digital component distribution system 110 can use the search query to identify digital components having distribution parameters that match (e.g., are the same as or otherwise match due at a specified level of similarity, such as qualifying under phrase matching or expanded matching, including plurals, stubs, synonyms, and other variants that are sufficiently similar to) the search query. The identification of the one or more digital components using the search query can be performed in a manner similar to that discussed above.

The determination of whether to distribute a digital component to a given user and/or which digital component to distribute to a given user can be informed by information about durations of user sessions in which the given user previously engaged. For example, when the given user has engaged in longer user sessions (e.g., longer than a specified amount of time) when interacting with documents provided by a particular content provider, the system can determine to distribute a digital component provided by that particular content provider to the given user. In contrast, the system can determine that no digital component, or digital component from a different content provider, is to be distributed to the given user when that given user has engaged in shorter user sessions (e.g., shorter than the specified amount of time) when interacting with the documents provided by the particular content provider.

In some situations, the distribution of content to the given user can be limited, thereby using less bandwidth, when the given user has spent less than the specified amount of time interacting with documents provided by the particular content provider. For example, in these situations, the system can either transmit smaller digital components (e.g., in terms of file size) to the given user or prevent distribution of digital components to the given user in order to limit the amount of bandwidth consumed providing content to the given user. Meanwhile, larger digital components (e.g., in terms of file size) can be distributed to the given user and/or the given user can be distributed a larger number of digital components when the user has spent at least the specified amount of time interacting with the documents provided by the particular content provider. For example, the given user can be more frequently distributed digital components provided by the particular content provider when the user has spent at least the specified amount of time interacting with the documents provided by the particular content provider.

In other situations, pre-caching determinations can be made based on the rations of user sessions in which the given user has engaged. For example, when the given user has historically engaged in longer user sessions when viewing documents provided by the particular content provider, additional data (e.g., content for other documents provided by the particular content provider) can be pre-cached at the client device while the user is browsing various documents provided by the particular content provider. In this way, presentation of the other documents will occur more quickly when the user requests those other documents.

Processes and examples for modifying the distribution of content to a user based on the duration of the user session at a website using a digital component distribution system 110 is now described with reference to FIGS. 2-5 below.

Figure 2:
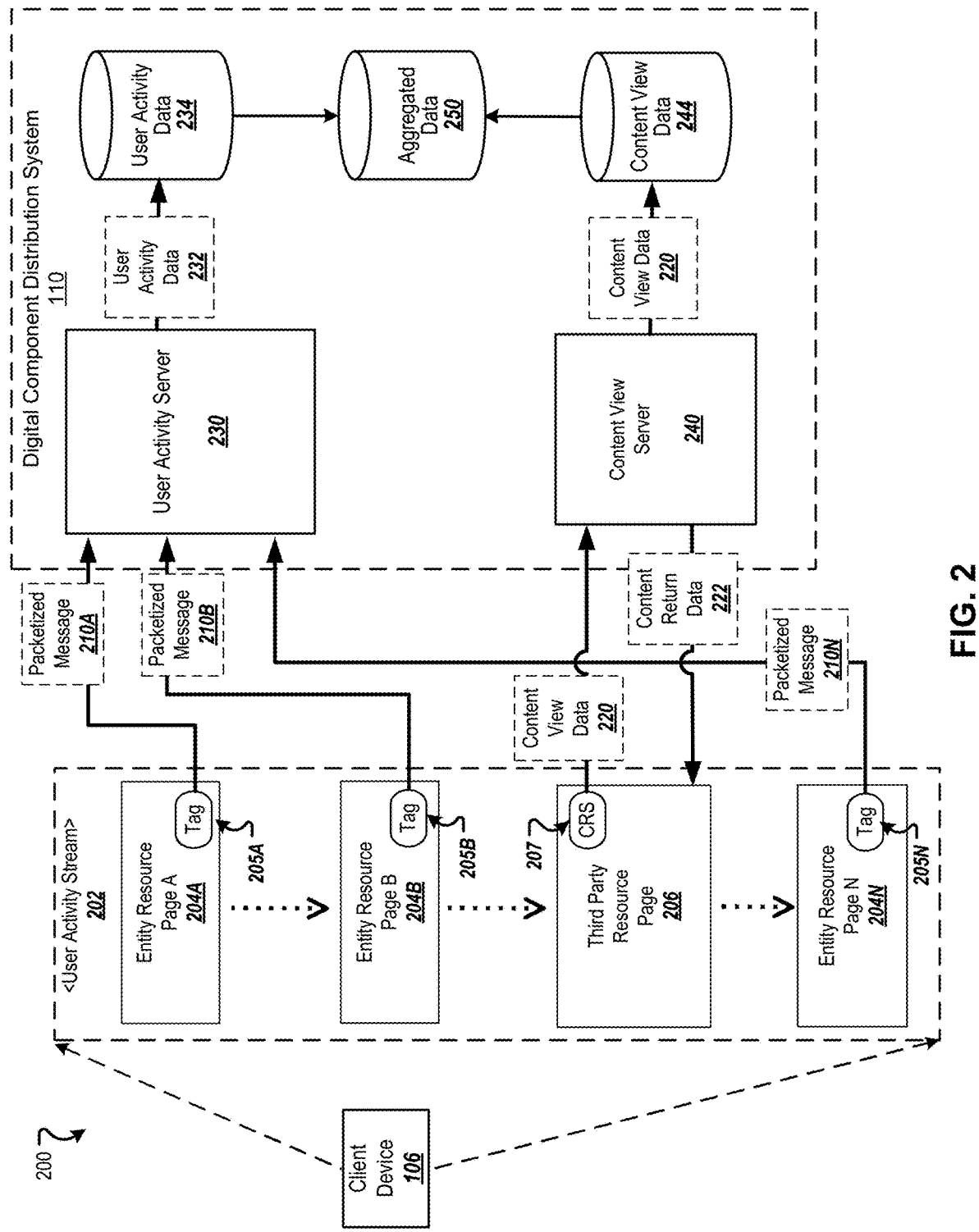
FIG. 2 is a system flow diagram of an example client device using a digital component distribution system.

FIG. 2 is a system flow diagram of an example environment 200 in which a digital component distribution system 110 can be implemented with a client device 106. The digital component distribution system 110 can include, among other components that enable the operations discussed above with reference to FIG. 1, a user activity server 230 and a content view server 240. The digital component distribution system 110 can also include a user activity data store 234 and a content view data store 244. In some implementations, the digital component distribution system 110 performs operations of the process 300 described with reference to FIG. 3 to aggregate data from the user activity data store 234 and the content view data store 244, for example, in an aggregated data store 250. The aggregated data can be used, as discussed below to determine durations of user sessions, which can be used to modify distribution of content to users.

Figure 3:
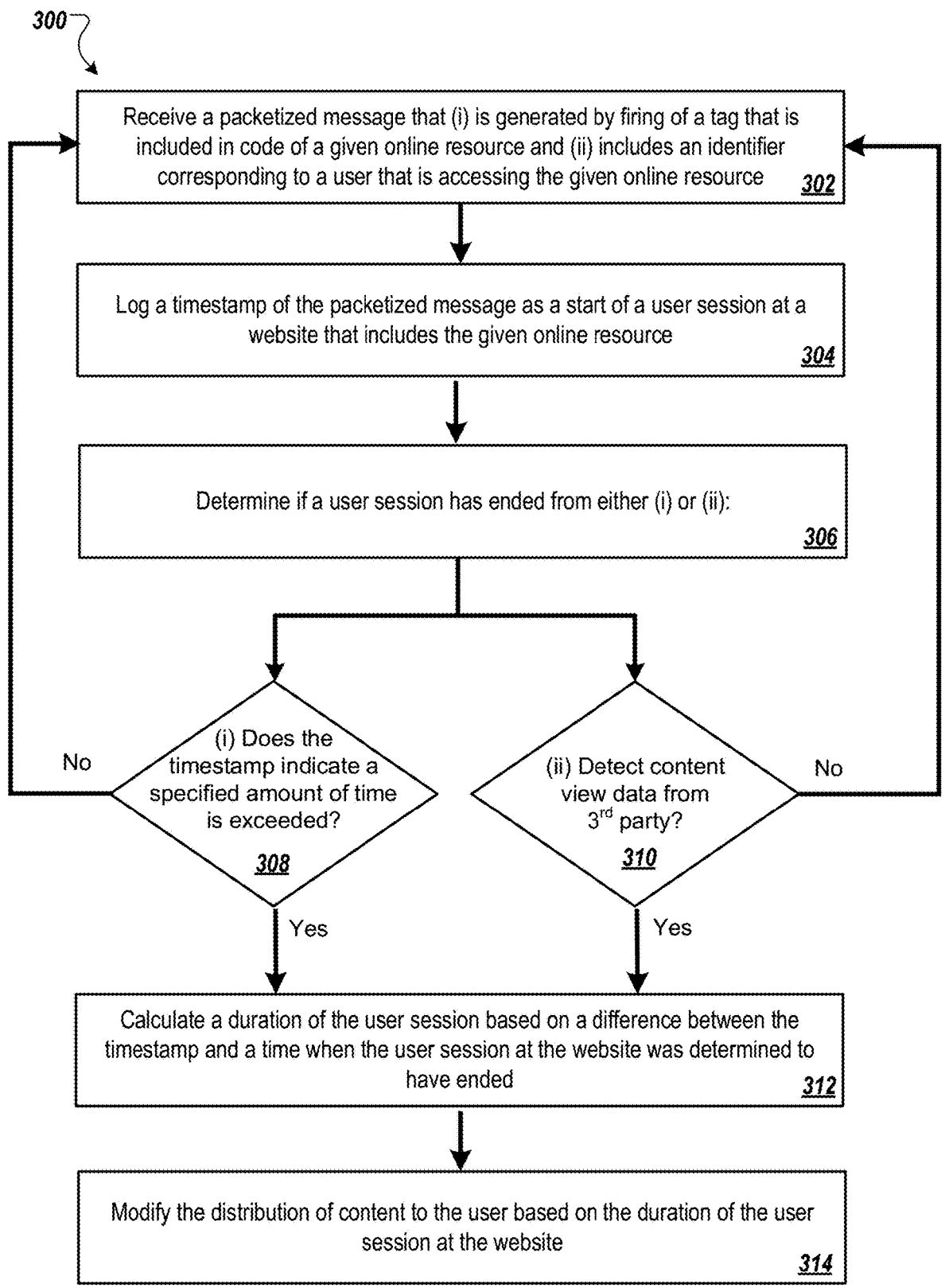
FIG. 3 is a flowchart of an example process for using a digital component distribution system.

FIG. 3 is a flow diagram of an example process 300 for modifying the distribution of content to a user based on the duration of a user session at a website using a digital component distribution system. The process 300 can be implemented, for example, by the digital component distribution system 110 of FIGS. 1 and 2, and illustrated by the system flow diagram of FIG. 2. Operations of the process 300 can also be implemented as instructions stored on non-transitory computer readable media, and execution of the instructions be one or more data processing apparatus can cause the one or more data processing apparatus to perform the operations of the process 300.

The process 300 receives a packetized message (302). In some implementations, the packetized message is generated by signaling of a tag that is included in code of a given online resource. The phrase signaling of a tag can also be referred to as firing of a tag. The packetized message can include an identifier of a user or corresponding to a user that is accessing the given online resource. For example, FIG. 2 illustrates a user activity stream 202 on a client device 106 for a particular user. In the example shown, the particular user visits an online resource (a webpage), such as entity resource page A 204A, and a tag (e.g., a script), such as reporting tag 205A, that is part of the online resource, fires (e.g., is processed and/or executed) as the entity resource page A 204A is rendered by a client device. The signaling of the reporting tag 205A causes the client device to generate a packetized message 210A. The packetized message 210A is sent from the client device to a user activity server 230 in the digital component distribution system 110. The packetized message 210A can include a user identifier (for example, a cookie or another user identifier, such as an account identifier) representing a user that is accessing the given online resource, a URL of page A 204A, and/or a data type indicator. In some embodiments the packetized message 210A can also include a timestamp that indicates when the user accesses the particular page A 204A. In some embodiments, the timestamp is added by the user activity server 230 when the packetized message 210A is received rather than being included in the packetized message 210A prior to receipt of the packetized message 210A.

As illustrated in FIG. 2, the user activity server 230 receives packetized message(s) 210 from the client device and logs the received user activity data 232 in the user activity data store 234. In some embodiments, the user activity server 230 can read each packetized message to determine the data type, a user identifier, a URL of the entity resource, and/or whether the message includes a timestamp. If there is not a timestamp included in a packetized message 210, the user activity server 230 can add a timestamp before logging the user activity data 232 in the user activity data store 234.

As shown in FIG. 2, the digital component distribution system 110 can also include a content view server 240. When a client device 106 accesses a third party resource page 206, a script running on the third party online resource page 206 fires, such as content request script (CRS) 207, and generates content view data 220. In the example embodiment, the content view data 220 is sent from third party resource page 206 to the content view server 240 in the digital component distribution system 110. In response to receiving the content view data 220, the content view server 240 can send content return data 222 to the resource page 206. The content view data 220 can be in the form of packetized request data (e.g. an HTTP request), and can include information about the third party resource (webpage) that is being rendered. For example, the content view data 220 can include a user identifier (for example, a cookie or another user identifier, such as an account identifier) representing a user that is accessing the third party resource page 206, a URL of third party resource page 206, and/or a data type indicator. In some embodiments, the content view data 220 can also include a timestamp that indicates when the user accessed the particular third party resource page 206. In some embodiments, a timestamp is added by the content view server 240 when the content view data 220 is received. Similar to the user activity server 230, the content view server 240 receives content view data 220 from the client device and logs the received content view data 220 in the content view data store 244. In some embodiments, the content view server 240 can read the received content data to determine a data type, a user identifier, a URL of the entity resource, and/or whether the message includes a timestamp. If there is not a timestamp included in the content view data 220, the content view server 240 and can add a timestamp before sending the content view data 220 to the content view data store 244.

In addition, as FIG. 2 illustrates, within a given user activity stream 202, as a user continues to view pages of a resource provided by a same content provider, such as page A 204A, page B 204B, page 204N, etc., a tag fires (e.g., tags 205A, 205B, 205N, etc.), which causes the client device to generate and send packetized messages (210A, 210B, 210N, etc.) to the user activity server 230 in the digital component distribution system 110. In some embodiments, the resources for a particular entity, such as a content provider, can be from a web browser, a native application installed on the client device 106, or a combination of the two. For example, a user may access shoes at an example entity webpage "example.com/shoes" in a browser on the client device 106 (i.e., page A 204A), and then access a similar resource or webpage through the example entities native application installed on the client device 106 (i.e., page B 204B). With both examples, the user activity server 230 could receive a packetized message 210 indicating that the user was looking at shoes within the same entity's resources, here both are the example entities resources. For example, each web page and/or native application user interface that includes a tag would cause the client device to generate a packetized message that would be transmitted to the user activity server.

Referring back to FIG. 3, the process 300 logs a timestamp of the packetized message as a start of a user session at a website that includes the given online resource (304). As discussed herein, in one example embodiment, a packetized message 210 can include a timestamp, or in other examples, the user activity server 230 can add a timestamp for each packetized message 210 that is received. An example data set that illustrates the logged timestamps is illustrated in FIG. 4.

FIG. 4 is an example table 400 of merged aggregated user session data within a digital component distribution system. The aggregated user session data can be merged, for example, by the digital component distribution system 110 of FIG. 2. For example, the digital component distribution system 110 can combine user activity data 232 and the content view data 220 to form the aggregated user session data, which can be stored in the aggregate data store 250.

The example aggregated user session data shown in table 400 specifies a plurality of resources (webpages) visited by a particular user. The resources visited by the particular user can be identified by the digital component distribution system 110 from the received packetized messages 210 and content view data 220. The table 400 includes columns of information such as a timestamp column 402, an information resource (webpage) URL column 404, a data type column 406, and the calculated user session duration column 408. The table 400 also includes different groups of differently shaded rows, with each group of rows having the same shading corresponding to a different user session. For example, rows 410A, 410B 410C, and 410D are included in user session 410, rows 412A, 412B are included in user session 412, and rows 416A, 416B are included in user session 416. Rows 414A, 414B are not shaded because these entries in the table 400 correspond to user visits to other resources (e.g., resources not provided by the content provider for which the user session durations are being determined). However, they can be grouped together as non-user session entries 414.

After the timestamp of the packetized message is logged, the process 300 determines if a user session has ended (306). In some implementations, the determination of whether the user session has ended is based on (i) whether a specified amount of time has passed since the timestamp of the most recently received packetized message (308), or (ii) whether content view data from a third party resource is detected (310). If the determination is "YES" to either decision branch, then the process 300 proceeds to step 312. However, if the determination is "NO" to both decision branches, then the process 300 returns to step 302 to receive another packetized message. This data processing loop can continue with receiving packetized messages 210 at step 302 until either one of the conditions is met (308, 310). In particular, the process 300 can determine that the user session at the website remains active while additional packetized messages generated by signaling of additional tags within the web site continue to be received within a specified amount of time of a timestamp of a most recently received packetized message. Meanwhile, the user session is determined to have ended when either (i) the specified amount of time after the time of the timestamp of the most recently received packetized message being received has been reached (e.g., step 308) or (ii) content view data specifying that third-party content was provided to a different website in response to a request that included the identifier corresponding to the user is detected (e.g., step 306). For example, timestamps will continue to be logged by the digital component distribution system and considered as part of one large user session if a user is viewing, for example, "shoes" at "example.com" during a user activity stream 202, as long as the system didn't detect that the user moved to a third party content resource (webpage) from the content view data 220, or an amount of time was not exceeded between received packetized messages 210 (e.g., >10 minutes).

In some embodiments, as illustrated in FIG. 2, as a user visits a page of a specific entity (e.g., content provider) owned online resource or navigates to a new resource page of the same entity (i.e., page B 204B), the digital component distribution system 110 can determine from the next packetized message received, e.g., packetized message 210B, that user is still viewing an online resource of the same entity. This is also illustrated in table 400 of FIG. 4, where, for example, row 410A can represent entity resource page A 204A, and include a timestamp and the URL (for example, "5:00:00 PM" and "example.com/shoes"), and row 410B can represent the next packetized message 210B received which represents information from entity resource page B 204B, which can include a timestamp and the URL (for example, "5:00:35 PM" and "example.com/shoes/brandX").

In some embodiments, the digital component distribution system 110 can compare the current time to the most recently received packetized message's timestamp (i.e., t=0). For example, the digital component distribution system 110 can start a timer after each received packetized message, and if that timer reaches timeout prior to receiving the next packetized message, then digital component distribution system 110 would determine an end of a user session. If another packetized message is received within the timeout period, the timer can be reset (i.e., t=0), and the process can repeat.

In some embodiments, the digital component distribution system 110 can compare the most recently received packetized message's timestamp to the previous timestamp of a particular user in the aggregated data set (e.g., table 400 of FIG. 4). If the user is still within the same entity owned online resource (e.g., "example.com"), and a time specified by the timestamp of the most recently received packetized message is within a specified amount of time of the prior packetized message timestamp (e.g., does not exceed 10 minutes), the digital component distribution system 110 can determine that the user session has not ended. However, if the time specified by the timestamp of the most recently received packetized message is outside the specified amount of time of the prior packetized message timestamp (e.g., exceeds 10 minutes), the digital component distribution system 110 can determine that the prior user session ended, and that the most recently received packetized message is the beginning of a new user session.

In some embodiments, the digital component distribution system 110 can determine if the user switched to a different third party online resource. For example, the digital component distribution system 110 can compare the aggregated data from the aggregated data set (e.g., table 400 of FIG. 4), and determine whether the most recently received data type is still from the same entity owned online resource (for this example, "example.com"), or if the user switched to a different third party online resource (e.g., switched to "examplesports.com"). For example, if the aggregated data set includes content view data that specifies that a digital component was requested for presentation to the user on examplesports.com, then the user session can be deemed to have ended at the time specified by the timestamp for the content view data.

According to some implementations, the digital component distribution system 110 can continually receive packetized messages 210 and content view data 220 for a plurality of user activity streams 202 of a plurality of users, and log the user activity data 232 in user activity data log 234, log the content view data 220 in content view data log 244, and merge the data in the aggregate data log 250 for each user.

An example of determining an end of a user session based on whether a timestamp indicates that a specified amount of time has been exceeded is described with reference to table 400 in FIG. 4. For example, the timestamp of row 410D is 5:05:30 PM and the timestamp of the next entry, row 412A is 6:25:00 PM. In this example, the data populating each of these rows comes from packetized messages from the same website ("example.com"). However, approximately 80 minutes passed between those two packetized messages, as indicated by the timestamps. In this example, the specified amount of time for determining whether a user session has ended is assumed to be 10 minutes. As such, the specified amount of time has been exceeded because 80 minutes exceeds that amount specified amount of time. Therefore, the digital component distribution system 110 can determine that these two rows 410D and 412A each correspond to a different user session. For example, row 410D represent the last packetized message received for user session 410, and row 412A can represent the first packetized message for user session 412.

An example of determining an end to a user session based on whether the user switched to a third party online resource and away from the first online resource is also describe with reference to table 400 in FIG. 4. For example, row 412B represents a packetized message having a time stamp of 6:25:45 PM, and the next packetized message received has a time stamp of 6:32:20 PM (row 416A). Thus, the amount of time between these two packetized messages is less than the specified amount of time (e.g., assuming a specified amount of time of 10 minutes from the example above). Thus, the user session 412 will not be deemed ended based on the specified amount of time being exceeded. However, the table 400 includes content view data having a timestamp of 6:28:46 (row 414A), and specifying that content was requested for presentation to the user on a different resource (e.g., other than example.com). As such, this is an indication that the user navigated away from example.com, thereby ending the user session 412. Thus, the digital component distribution system 110 can then determine that the last packetized message received during user session 412 is represented by the row 412B at the 6:25:45 PM timestamp mark.

The process 300 calculates a duration of the user session based on a difference between the timestamp and a time when the user session at the website was determined to have ended (312). For example, as illustrated by table 400 in FIG. 4, the digital component distribution system 110 determined that the duration of the user session 410 was five minutes and thirty seconds ("5 m 30 s"), which is the difference in timestamps between first and last timestamp included in the user session 410. As discussed above, the end of the user session was determined to be the 5:05:30 PM mark (row 410D), because the packet received at 6:25:00 PM (row 412A) exceeded the specified amount of time of 10 minutes. In some implementations, the specified amount time can be adjusted as to what the content distributor determines to be an appropriate amount of time that a user most likely stopped browsing the same page and either stopped using the client device, or used a different non-browsing application on the device.

The process 300 modifies the distribution of content to the user based on the duration of the user session at the website (314). For example, the digital component distribution system 110 can modify which content is provided to specific sets or subsets of users which can result in more efficient utilization of bandwidth and computing resources. An example process for segmenting the aggregate set of user session data into two or more subsets to provide an administrator of a content provider is described with reference to FIG. 5 below.

Figure 5:
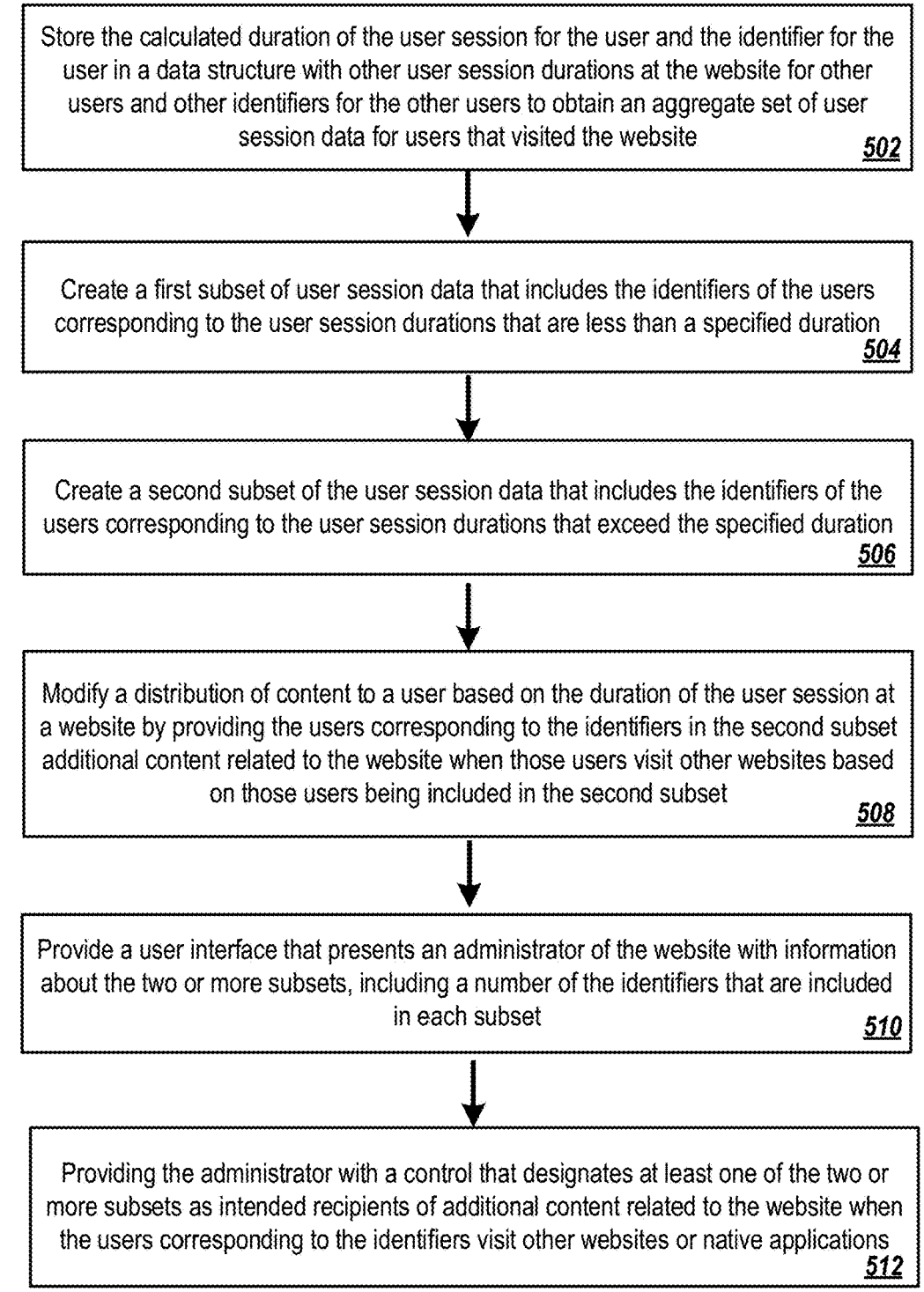
FIG. 5 is a flowchart of an example process for using a digital component distribution system.

FIG. 5 is a flow diagram of an example process 500 for modifying the distribution of content based on subsets of user session data using a digital component distribution system. The process 500 can be implemented, for example, by the digital component distribution system 110 of FIGS. 1 and 2.

The process 500 stores the calculated duration of the user session for the user and the identifier for the user in a data structure with other user session durations at the website for other users and other identifiers for the other users to obtain an aggregate set of user session data for users that visited the website (502). For example, after determining a user session has ended and calculating user session durations (e.g., durations of user sessions 410, 412, 416 as shown in FIG. 4), the digital component distribution system 110 can store the calculated duration of each user session in a data store, such as aggregate data store 250, or another database the digital component distribution system 110 can access.

The process 500 segments the aggregate set of user session data into two or more subsets based on lengths of time specified by the user session durations. For example, a first subset of user session data that includes the identifiers of the users corresponding to the user session durations that are less than a specified duration can be created (504). Similarly, a second subset of the user session data that includes the identifiers of the users corresponding to the user session durations that exceed the specified duration can be created (506). In some implementations, the digital component distribution system 110 can create a subset of user session durations using a time threshold determined by content providers. For example, a particular content provider may select a time threshold of two minutes (or some other time threshold) based on a determination that a user has a higher likelihood in being interested in the particular resource of an entity (e.g., "example.com") or a subset of a resource (e.g., "example.com/shoes") when their session durations are at least this long. In accordance with this example, as illustrated in FIG. 4, user session duration 412 ("45 s") would be included in the first subset since user session duration 412 was determined to be less than two minutes, and user session duration 410 ("5 m 30 s) and user session duration 416 ("2 m 40 s") would be included in the second subset, as user session duration 410 and 416 are each over the two minute specified duration.

The process 500 modifies a distribution of content to a user based on the duration of the user session at a website by providing the users corresponding to the identifiers in the second subset additional content related to the website when those users visit other websites based on those users being included in the second subset (508). For example, similarly as discussed above for process 300, the digital component distribution system 110 can modify the distribution of content specifically based the different subsets of data that was created. In some implementations, multiple subsets of data can be created, such as based on different segments of time thresholds (e.g, less than five minutes, between five and ten minutes, greater than ten minutes, and the like), and/or based on different subsets within the same entities resources (e.g., "brand X shoes", "soccer shoes", "women's shoes", and the like). By creating subsets of different time thresholds, a content provider can than determine to not modify content to users who may have only spent thirty seconds or less browsing through a portion of the entities resource.

The process 500 provides a user interface that presents an administrator of the web site with information about the two or more subsets, including a number of the identifiers that are included in each subset (510). The process 500 provides the administrator with a control that designates at least one of the two or more subsets as intended recipients of additional content related to the website when the users corresponding to the identifiers visit other websites or native applications (512). For example, as discussed above, the digital component distribution system 110 can provide several different combinations of subsets for the same entity. The different combination of subsets can include, for example, subset 1, subset 2, and subset 3. In this example, subset 1 includes users who spend less than two minutes on a particular resource for the example entity (e.g., "example.com/shoes"). In this example, subset two includes users who spend greater than five minutes on the same particular resource for the example entity. In this example, subset three includes users who spend greater than two minutes on a subset of the same particular resource for the example entity (e.g., "walmart.com/shoes/soccer"). Of course other subsets can also be provided. The administrator (e.g., content provider) can submit a request to the digital component distribution system 110 specifying which of the subsets are to be used to distribute the content. For example, assume that the administrator submits a request to the digital component distribution system 110 to distribute a given digital component to those users that are included in subset X, which includes users that spend Y time on the content provider's web site. In this example, the digital component distribution system 110 can limit distribution of the digital component to those users that are included in subset X. In this way, the amount of bandwidth used to distribute the digital component can be optimized (e.g., used more efficiently) by limiting distribution of the digital component to only those users in the subset of users that spent at least Z amount of time on the content provider's website. As such, the amount of bandwidth used to distribute the digital component is also reduced (or limited), thereby more efficiently utilizing the amount of bandwidth used to distribute the digital component.

In addition to enabling the administrator to selectively distribute digital components to any of the subsets of users, the user session duration information can be used to provide the administrator with more information about how users interact with their website or other electronic documents (e.g., native applications). For example, analytics, such as an average user session duration, a histogram of user session durations, and/or other metrics that provide information about how long users spend on the content provider's website, or certain pages of the content provider's website can also be generated based on the information provided in the table 400, and presented to the content provider. This information can be provided, for example, to supplement other analytics data that the administrator may be obtaining, and can be provided in situations where the other analytic data may not be obtainable (e.g., due to incompatibilities with the manner in which the other analytic data is obtained.

In some implementations, the digital component distribution system 110 can detect a device type identifier in the packetized message 210. The device type identifier specifies the type of device corresponding to the packetized message. For example, the device type identifier can specify a model number of the device, manufacturer of the device, and/or a form factor of the device. In some implementations, the device type identifier can specify whether the device type is mobile, tablet, or desktop. Device type identifiers also be detected for other packetized messages received from other devices.

The device type identifiers can be used to delineate the user sessions on a per-device-type basis. For example, for user sessions corresponding to the packetized message 210 and the other packetized messages, the digital component distribution system 110 can determine a portion of the user sessions that were conducted using a mobile device based on the device type identifiers, a portion of the user sessions that were conducted using a tablet device, and/or a portion of the users sessions that were conducted using a desktop device. The portion of user sessions that were conducted using each device type can be determined, for example, by simply counting the number of user sessions that included packetized messages specifying that device type. In some implementations, the digital component distribution system 110 can modify the distribution of content to the user based on the duration of the user session at the website and based on the portion of the user sessions that were conducted using the mobile device. For example, if the user sessions conducted using mobile devices had the highest user session duration, the digital component distribution system 110 can limit distribution of content to mobile devices.

In some situations, the digital component distribution system 110 can determine that the duration of the user session exceeds a threshold duration. In these situations, the distribution of content to the user can be modified by pre-caching, at a client device of the user, data of web pages of the website when the user subsequently initiates a new session at the website. For example, when that user subsequently requests a first web page of the website, content of other webpages in the website (e.g., pages frequently visited by that user) can be cached at the client device to speed navigation among pages of the website. This pre-caching can be limited to those users that spend at least a minimum amount of time at the website so as to not waste bandwidth pre-caching data at client devices of users that are not likely to navigate to many pages of the website.

In some implementations, the digital component distribution system 110 can modify distribution of content to the user based on the duration of the user session at the web site to control bandwidth usage for distribution of content based on the duration of the user session. In some implementations, controlling bandwidth usage for distribution of content based on the duration of the user session includes reducing an amount of bandwidth used for distribution of content to the user when the duration of the user session is below a specified amount. For example, when a user tends to spend little time at a website the content provided to the user may be limited to text content. Alternatively, or additionally, the amount of multimedia content loaded in these situations may be limited to reduce the amount of bandwidth utilized to provide content to the user that spends very little time at the website. Furthermore, digital components that reference the website (e.g., include a hyperlink to the website) can be prevented from being distributed to users that spend very little time at the website (e.g., have user session durations below a specified duration).

In some implementations, modifying the distribution of content to the user based on the duration of the user session at the website, can include providing the users corresponding to the identifiers in the second subset additional content related to the website when those users visit other websites based on those users being included in the second subset. Recall that the second subset includes those user identifiers of users having session durations that exceed the specified duration, such that providing additional content related to the website to these users is likely an efficient use of the bandwidth used to transmit the content.

Figure 6:
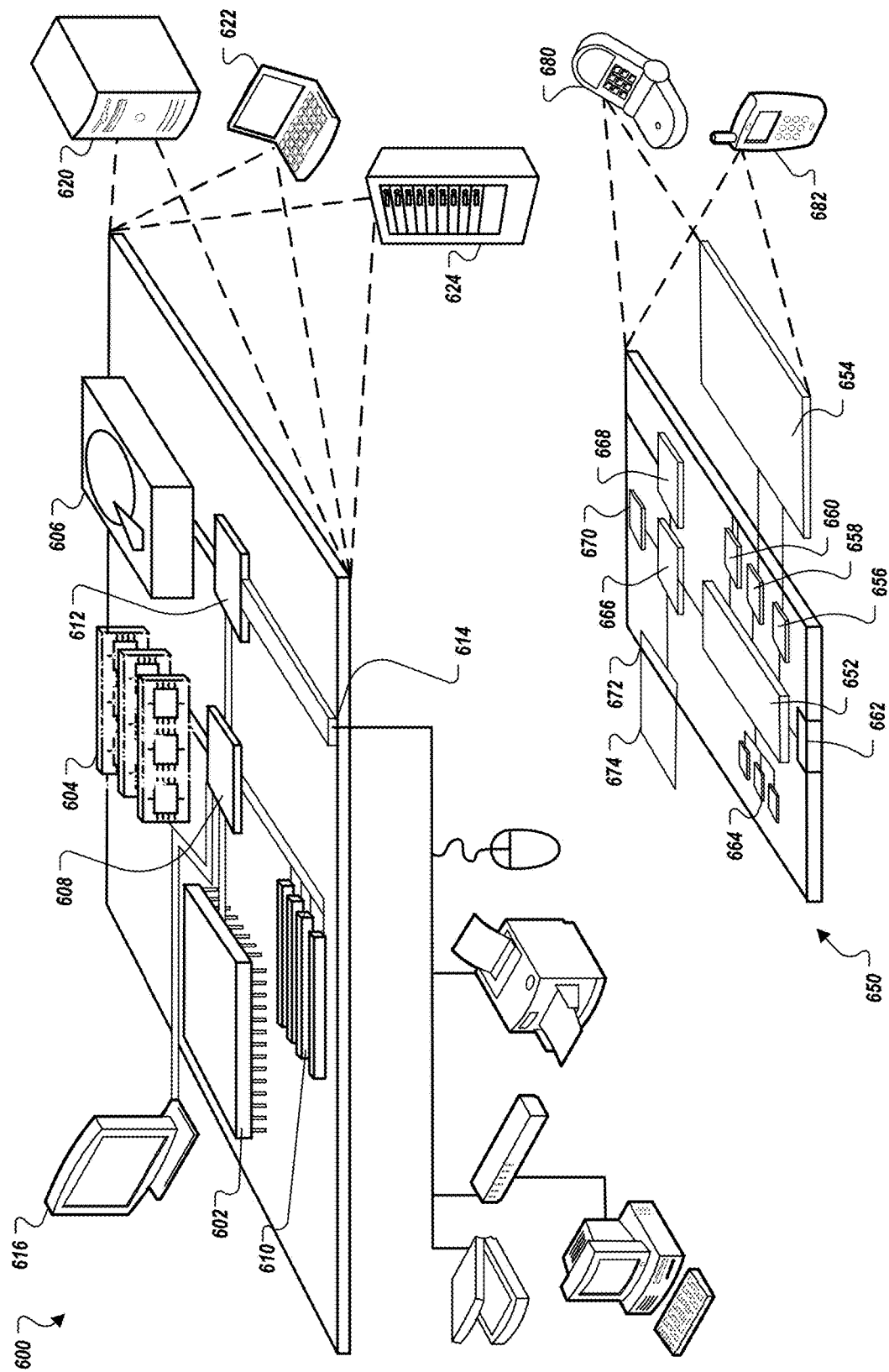
FIG. 6 is a block diagram of an example computer system that can be used to implement the methods, systems and processes described in this disclosure.

FIG. 6 is a block diagram of example computing devices 600, 650 that can be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 600 is further intended to represent any other typically non-mobile devices, such as televisions or other electronic devices with one or more processers embedded therein or attached thereto. Computing device 650 is intended to represent various forms of mobile devices, such as personal digital assistants, cellular telephones, smartphones, and other computing devices. The components shown here, their connections and relationships, and their functions, are meant to be examples only, and are not meant to limit implementations of the inventions described and/or claimed in this document.

Computing device 600 includes a processor 602, memory 604, a storage device 606, a high-speed controller 608 connecting to memory 604 and high-speed expansion ports 610, and a low-speed controller 612 connecting to low-speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high-speed controller 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a computer-readable medium. In one implementation, the memory 604 is a volatile memory unit or units. In another implementation, the memory 604 is a non-volatile memory unit or units.

The storage device 606 is capable of providing mass storage for the computing device 600. In one implementation, the storage device 606 is a computer-readable medium. In various different implementations, the storage device 606 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 604, the storage device 606, or memory on processor 602.

The high-speed controller 608 manages bandwidth-intensive operations for the computing device 600, while the low-speed controller 612 manages lower bandwidth-intensive operations. Such allocation of duties is an example only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed bus 614. The low-speed bus 614 (e.g., a low-speed expansion port), which may include various communication ports (e.g., USB, Bluetooth®, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as computing device 650. Each of such devices may contain one or more of computing devices 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The computing device 650 may also be provided with a storage device, such as a micro-drive or other device, to provide additional storage. Each of the components 650, 652, 664, 654, 666, and 668, are interconnected using various buses, and several of the components may be mounted on a common motherboard or in other manners as appropriate.

The processor 652 can process instructions for execution within the computing device 650, including instructions stored in the memory 664. The processor may also include separate analog and digital processors. The processor may provide, for example, for coordination of the other components of the computing device 650, such as control of user interfaces, applications run by computing device 650, and wireless communication by computing device 650.

Processor 652 may communicate with a user through control interface 658 and display interface 656 coupled to a display 654. The display 654 may be, for example, a TFT LCD display or an OLED display, or other appropriate display technology. The display interface 656 may include appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of computing device 650 with other devices. External interface 662 may provide, for example, for wired communication (e.g., via a docking procedure) or for wireless communication (e.g., via Bluetooth® or other such technologies).

The memory 664 stores information within the computing device 650. In one implementation, the memory 664 is a computer-readable medium. In one implementation, the memory 664 is a volatile memory unit or units. In another implementation, the memory 664 is a non-volatile memory unit or units. Expansion memory 674 may also be provided and connected to computing device 650 through expansion interface 672, which may include, for example, a subscriber identification module (SIM) card interface. Such expansion memory 674 may provide extra storage space for computing device 650, or may also store applications or other information for computing device 650. Specifically, expansion memory 674 may include instructions to carry out or supplement the processes described above, and may include secure information also. Thus, for example, expansion memory 674 may be provide as a security module for computing device 650, and may be programmed with instructions that permit secure use of computing device 650. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652.

Computing device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 668 (e.g., a radio-frequency transceiver). In addition, short-range communication may occur, such as using a Bluetooth®, WiFi, or other such transceiver (not shown). In addition, GPS receiver module 670 may provide additional wireless data to computing device 650, which may be used as appropriate by applications running on computing device 650.

Computing device 650 may also communicate audibly using audio codec 660, which may receive spoken information from a user and convert it to usable digital information. Audio codec 660 may likewise generate audible sound for a user, such as through a speaker, e.g., in a handset of computing device 650. Such sound may include sound from voice telephone calls, may include recorded sound (e.g., voice messages, music files, etc.) and may also include sound generated by applications operating on computing device 650.

The computing device 650 may be implemented in a number of different forms, as shown in the figure. For example, it may be implemented as a cellular telephone 680. It may also be implemented as part of a smartphone 682, personal digital assistant, or other mobile device.

In situations in which the systems discussed here collect personal information about users, or may make use of personal information, the users may be provided with an opportunity to control whether applications or features collect user information (e.g., information about a user's social network, social actions or activities, profession, a user's preferences, or a user's current location), or to control whether and/or how to receive content that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method, comprising:
 receiving, over a network and by a content distribution system, a message that is generated by firing of a tag that is included in code of a given online resource being viewed by a user;
 determining, by the content distribution system, that a user session at the website remains active while additional messages generated by firing of the tag or additional tags continue to be received within a specified amount of time;
 determining, by the content distribution system, that the user session has ended;
 calculating, by the content distribution system, a duration of the user session based on a difference between a timestamp and a time when the user session was determined to have ended;
 storing the calculated duration of the user session for the user and the identifier for the user in a data structure with other user session durations for other users and other identifiers for the other users to obtain an aggregate set of user session data for users;
 segmenting the aggregate set of user session data into two or more subsets based on lengths of time specified by the user session durations, including:

creating a first subset of user session data that includes the identifiers of the users corresponding to the user session durations that are less than a specified duration; and creating a second subset of the user session data that includes the identifiers of the users corresponding to the user session durations that exceed the specified duration; and modifying distribution of content to the user based on the duration of the user session, wherein modifying distribution of content to the user based on the duration of the user session comprises providing the users corresponding to the identifiers in the second subset additional content related to the given online resource when those users visit other online resources based on those users being included in the second subset.

2. The method of claim 1, further comprising:
determining that the duration of the user session exceeds a threshold duration, wherein modifying distribution of content to the user based on the duration of the user session includes in response to determining that the user session exceeds a threshold duration pre-caching, at a client device of the user, data of web pages of a web site when the user subsequently initiates a new session at the website.

3. The method of claim 1, further comprising:
providing a user interface that presents an administrator of the website with information about the two or more subsets, including a number of the identifiers that are included in each subset; and
providing the administrator with a control that designates at least one of the two or more subsets as intended recipients of additional content related to the given online resource when the users corresponding to the identifiers visit different websites or native applications.

4. The method of claim 1, wherein modifying distribution of content to the user based on the duration of the user session comprises controlling bandwidth usage for distribution of content based on the duration of the user session.

5. The method of claim 4, wherein controlling bandwidth usage for distribution of content based on the duration of the user session comprises reducing an amount of bandwidth used for distribution of content to the user when the duration of the user session is below a specified amount.

6. The method of claim 1, further comprising:
detecting device type identifiers in the packetized message and other packetized messages; and
determining, for user sessions corresponding to the packetized message and the other packetized messages, a portion of the user sessions that were conducted using a mobile device based on the device type identifiers, wherein modifying distribution of content to the user based on the duration of the user session includes modifying the distribution of content based on the portion of the user sessions that were conducted using the mobile device.

7. A system comprising:
a data storage device; and
one or more processors configured to interact with the data storage device and perform, upon execution of instructions, operations comprising:
receiving, over a network, a message that is generated by firing of a tag that is included in code of a given online resource being viewed by a user;
determining that a user session at the website remains active while additional messages generated by firing of the tag or additional tags within the website continue to be received within a specified amount of time;
determining that the user session has ended;
calculating a duration of the user session based on a difference between a timestamp and a time when the user session was determined to have ended;
storing the calculated duration of the user session for the user and the identifier for the user in a data structure with other user session durations for other users and other identifiers for the other users to obtain an aggregate set of user session data for users;
segmenting the aggregate set of user session data into two or more subsets based on lengths of time specified by the user session durations, including:
creating a first subset of user session data that includes the identifiers of the users corresponding to the user session durations that are less than a specified duration; and
creating a second subset of the user session data that includes the identifiers of the users corresponding to the user session durations that exceed the specified duration; and
modifying distribution of content to the user based on the duration of the user session, wherein modifying distribution of content to the user based on the duration of the user session comprises providing the users corresponding to the identifiers in the second subset additional content related to the given online resource when those users visit other online resources based on those users being included in the second subset.

8. The system of claim 7, wherein the instructions cause the one or more processors to perform operations further comprising:
determining that the duration of the user session exceeds a threshold duration, wherein modifying distribution of content to the user based on the duration of the user session includes in response to determining that the user session exceeds a threshold duration pre-caching, at a client device of the user, data of web pages of a web site when the user subsequently initiates a new session at the website.

9. The system of claim 7, wherein the instructions cause the one or more processors to perform operations further comprising:
providing a user interface that presents an administrator of the website with information about the two or more subsets, including a number of the identifiers that are included in each subset; and
providing the administrator with a control that designates at least one of the two or more subsets as intended recipients of additional content related to the given online resource when the users corresponding to the identifiers visit different websites or native applications.

10. The system of claim 7, wherein modifying distribution of content to the user based on the duration of the user session comprises controlling bandwidth usage for distribution of content based on the duration of the user session.

11. The system of claim 10, wherein controlling bandwidth usage for distribution of content based on the duration of the user session comprises reducing an amount of bandwidth used for distribution of content to the user when the duration of the user session is below a specified amount.

12. A non-transitory computer readable medium storing instructions that, when executed, cause one or more processors to perform operations comprising:
- receiving, over a network, a message that is generated by firing of a tag that is included in code of a given online resource being viewed by a user;
- determining that a user session at the website remains active while additional messages generated by firing of the tag or additional tags within the website continue to be received within a specified amount of time;
- determining that the user session has ended;
- calculating a duration of the user session based on a difference between a timestamp and a time when the user session was determined to have ended;
- storing the calculated duration of the user session for the user and the identifier for the user in a data structure with other user session durations for other users and other identifiers for the other users to obtain an aggregate set of user session data for users;
- segmenting the aggregate set of user session data into two or more subsets based on lengths of time specified by the user session durations, including:
  - creating a first subset of user session data that includes the identifiers of the users corresponding to the user session durations that are less than a specified duration; and
  - creating a second subset of the user session data that includes the identifiers of the users corresponding to the user session durations that exceed the specified duration; and
- modifying distribution of content to the user based on the duration of the user session, wherein modifying distribution of content to the user based on the duration of the user session comprises providing the users corresponding to the identifiers in the second subset additional content related to the given online resource when those users visit other online resources based on those users being included in the second subset.

13. The non-transitory computer readable medium of claim 12, wherein the instructions cause the one or more processors to perform operations further comprising:
- determining that the duration of the user session exceeds a threshold duration, wherein modifying distribution of content to the user based on the duration of the user session includes in response to determining that the user session exceeds a threshold duration pre-caching, at a client device of the user, data of web pages of a web site when the user subsequently initiates a new session at the website.

14. The non-transitory computer readable medium of claim 12, wherein the instructions cause the one or more processors to perform operations further comprising:
- providing a user interface that presents an administrator of the website with information about the two or more subsets, including a number of the identifiers that are included in each subset; and
- providing the administrator with a control that designates at least one of the two or more subsets as intended recipients of additional content related to the web site when the users corresponding to the identifiers visit other websites or native applications.

* * * * *